April 8, 1930.                D. W. MELL                1,754,115
                           ANTIRATTLING DEVICE
                           Filed Oct. 24, 1927
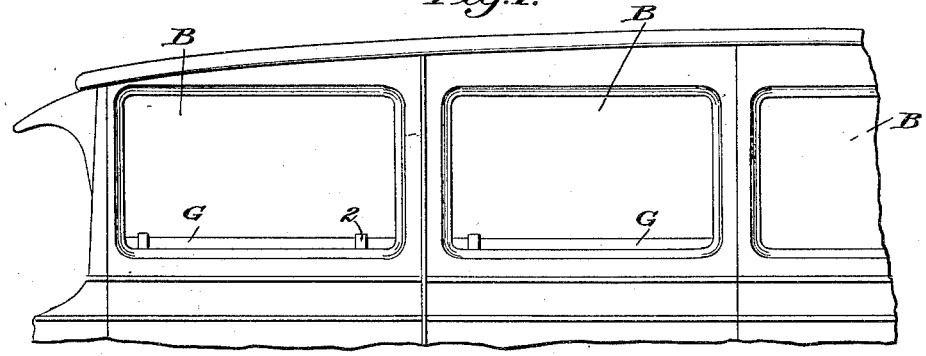
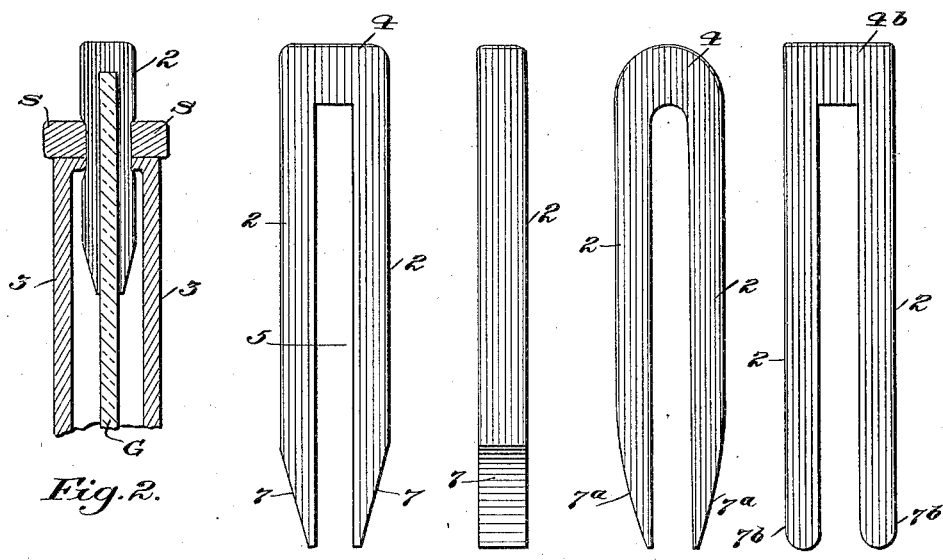
Fig.2.   Fig.3.   Fig.4.   Fig.5.   Fig.6.
Inventor:
Daisy W. Mell,
by C. A. Mason Att'y.

Patented Apr. 8, 1930

1,754,115

UNITED STATES PATENT OFFICE

DAISY W. MELL, OF ATHENS, GEORGIA

ANTIRATTLING DEVICE

Application filed October 24, 1927. Serial No. 228,445.

This invention relates to anti-rattling devices for eliminating the objectionable noise due to the vibration of the windows in their frames.

The invention is particularly directed to devices of the character referred to which are employed for holding in fixed position the glass which slides across the window openings in the bodies of motor vehicles, although it is obviously capable of use in other relations.

Preferably the device is formed of some yielding material, which may be elastic, as rubber, and is so shaped as to fit over the edge of a pane of glass and down within the frame or enclosure in such manner as to hold the glass firmly, but with a slight amount of yielding pressure in its frame.

The invention will best be understood by reference to the accompanying drawings, illustrating preferred forms, in connection with the following specification.

In the drawings:

Fig. 1 illustrates a portion of an automobile body, disclosing three window openings, with the invention applied thereto;

Fig. 2 is an enlarged, sectional view of a portion of the window frame showing the glass retained in position by a device made in accordance with this invention;

Fig. 3 is an enlarged view in side elevation illustrating one form of the invention;

Fig. 4 is a view at right angles to Fig. 3;

Fig. 5 is a side elevation of a slightly modified construction; and

Fig. 6 is a similar view of another form of the invention.

Referring to Fig. 1, a car body is shown as provided with the usual window openings B, across which slides the pane of glass G. This glass moves between the walls 3, 3 which form between them a recess to receive the glass as it is lowered to disclose the window openings. Ordinarily, strips S are applied along the top edge of the walls 3, constituting a finish therefor and providing the final opening through which the glass G slides in moving into open or closed position, such movements of the glass being effected by suitable mechanism which is operable from within the car.

The pane of glass G necessarily fits with more or less looseness within the recess between the walls 3, 3, and when the vehicle is moving over rough roads, or meets any obstacles causing vibration, the glass "rattles" or makes a disagreeable noise, which is quite objectionable. The present invention seeks to eliminate this noise by firmly, but yieldingly holding the edge of the glass in position between the walls of the casing. The invention comprises a double wedge consisting of spaced limbs 2, 2 connected at their upper ends by a cross member 4, and providing a space 5 between the limbs 2, 2. The lower extremities of the limbs 2 may be beveled off as shown at 7 to provide for easy insertion of the device in position, as shown in Fig. 2. When in such position the limbs 2, 2, straddle the upper, or any other edge of the glass G and pass within the space between the walls 3, 3, and strips S, S, thereby firmly holding the edge of the glass in position, and preventing the glass from contact with the sides of the opening or space which receives it, thus eliminating the objectionable noise due to its vibration.

In the form of the invention shown in Fig. 5 the connecting portion 4 is slightly altered, being curved at its upper and lower edges, said curves merging into the outer and inner faces of the limbs 2, 2, while the lower extremities of the limbs are gradually tapered along curved lines $7^a$, $7^a$, to the final points at the ends of the limbs.

In the construction shown in Fig. 6, instead of tapering the lower extremities of the limbs in the form of wedges to a point, such lower extremities are rounded off, as shown at $7^b$, $7^b$.

In all of the forms disclosed, or in any similar forms which embody the broad idea of a forked, yieldable anti-rattling device susceptible of the uses herein indicated, such device is slipped over the edge of each sheet of glass, and the ends are caused to pass down upon each side of the glass and to wedge the same firmly in position in the recess of the window frame, thus preventing the glass from rattling.

The right is reserved to make such changes in the form or outline of the device as are contemplated by the invention, provided that the same are within the scope of the following claims.

I claim as my invention:

1. An anti-rattling device comprising a forked member of yielding material having parallel limbs arranged to embrace the upper edge of a pane of glass, said members being of a length sufficient to pass between the edge of the glass and the adjacent walls of a casing in which the glass slides when the glass is in fully lowered position, and to wedge the pane of glass tightly in its casing.

2. In an anti-rattling device for windows, an elastic body having two adjacent limbs and a connecting member at one end of said limbs and arranged to straddle the exposed edge of a pane of glass of a carriage window, the limbs being of a length sufficient to extend down and be interposed between the opposite faces of the glass and the window casing when the glass is in its lowermost open position, to tightly wedge the glass in its casing.

3. An anti-rattling device made of elastic material and comprising two spaced limbs connected by a cross member having their lower extremities constructed to enter between the opposite faces of a pane of glass and its enclosing casing when the glass is in fully lowered position in its casing and to wedge the glass tightly in position therein.

In testimony whereof I have hereunto set my hand this 22nd day of October A. D. 1927.

DAISY W. MELL.